United States Patent [19]
Cunningham

[11] Patent Number: 5,565,714
[45] Date of Patent: Oct. 15, 1996

[54] POWER CONSERVATION CIRCUIT

[76] Inventor: John C. Cunningham, 181 Lexington St. Apt. 33, Newton, Mass. 02166

[21] Appl. No.: 468,934

[22] Filed: Jun. 6, 1995

[51] Int. Cl.$^6$ ........................................... H02J 3/06
[52] U.S. Cl. ..................... 307/112; 307/116; 307/126; 307/125; 307/64; 307/66; 323/234; 323/236; 361/18
[58] Field of Search ................................. 307/126, 112, 307/116, 125, 64, 66; 323/234, 236; 361/18

[56] References Cited

U.S. PATENT DOCUMENTS

| | | | |
|---|---|---|---|
| 4,237,385 | 12/1980 | Jurgens et al. | 307/66 |
| 4,428,015 | 1/1984 | Nesler | 361/18 |
| 5,272,382 | 12/1993 | Heald et al. | 307/66 |
| 5,306,955 | 4/1994 | Fryer | 307/116 |
| 5,387,858 | 7/1995 | Bender et al. | 320/61 |

*Primary Examiner*—William M. Shoop, Jr.
*Assistant Examiner*—Albert W. Paladini
*Attorney, Agent, or Firm*—Bromberg & Sunstein

[57] ABSTRACT

A power conservation circuit having a low voltage power supply for powering a first and second switch. The first switch connects output terminals to either the low voltage power supply or a powered device. The second switch connects or disconnects power to the powered device. The low voltage power supply provides a sensing current when a load is placed across the output terminals. The current goes to a control switch which causes the first and second switches to switch into the ON state. A sensing circuit detects the continued draw of current from the powered device while a load is present. The sensing circuit maintains the control switch in the ON state. In the absence of any loads on the output terminals, the sensing circuit causes the control switch to switch the first and second switches into the OFF state. In the OFF state, power is disconnected from the powered device thereby conserving power when there is no load requesting the use of the powered device.

29 Claims, 4 Drawing Sheets

POWER CONSERVATION CIRCUIT

BACKGROUND OF THE INVENTION

The invention relates generally to a power conservation circuit for use with a powered device such as an inverter, transformer, regulator, power supply or the like. In particular, the power conservation circuit of the invention removes power to the powered device in the absence of a load.

The present application is related to this inventor's prior patent, U.S. Pat. No. 5,324,990 entitled Voltage Inverter Power Conservation Circuit. With regard to the control of battery-powered inverters used for AC power supply backup, the following references describe the relevant background art.

U.S. Pat. No. 4,508,974 to Henderson discloses a logic controlled battery-powered inverter for use with a motor generator set that is used to provide clean, noise-free power to a load such as a computer. The inverter operates only when normal utility power fails, and employs the ability of the motor generator set to handle brief power outages to power the load for the brief time needed to decouple the main line power supply and couple the inverter to the motor generator.

U.S. Pat. No. 4,667,116 to Honjo et al. discloses an inverter control circuit for switching a load from an inverter to a commercial power source uninterruptedly by means of a thyristor when access to the synchronization circuit of the inverter is required for repair or servicing.

U.S. Pat. No. 4,946,096 to Ballard et al. discloses a method and apparatus for operating a furnace from a 120 V DC battery. A furnace which normally operates from a residential AC power source is adapted to operate on auxiliary DC power by changing the normal control function to prevent the furnace from operating in the high heat mode during periods of auxiliary power use.

U.S. Pat. Nos. 4,956,563 and 5,055,703 to Schornack, the Schornack '563 and the Schornack '703 references, discloses a battery operated standby inverter power supply using an electromechanical relay switching network to connect and disconnect line power between input and output terminals. An overcurrent relay pulser rapidly opens the witching system relay contacts upon transition to battery mode, and a breakover diode network accelerates field collapse in the relay coil attendant to reversion of the relay to its normally closed condition attendant to each battery to line transition. A fault detector establishes acceptable line voltage thresholds, the exceeding of either of which triggers operation from line to battery mode.

U.S. Pat. No. 4,977,351 to Bavaro discloses an emergency lighting system which permits at least one gas discharge lamp to be operated from an AC power source when AC current is present and from a battery when AC signal is not present. To conserve battery power in the DC mode, controls are also provided for turning off the light or reducing its output level in response to such control inputs as an ambient light detector or manually operated dimmer control.

U.S. Pat. No. 5,001,623 to Magid discloses a power supply which automatically adapts to different input power sources. A double pole, double throw, latching relay switches the primaries of the rectifier transformer to a series or to a parallel configuration depending upon the output voltage of the rectifier, thus adapting the circuit to either a nominal 220 V AC source or a nominal 120 V AC source. When a 24 V DC source is connected to the DC input, it is also connected to the rectifier output through a diode, so that power is furnished to the load by whichever source has the higher voltage. In this configuration, a battery pack can be connected to the DC input to supply automatic backup power.

U.S. Pat. No. 5,010,469 to Bobry discloses an uninterruptible power supply having an inverter that operates in either high voltage DC supplied by a line-powered power supply or on low voltage DC batteries. With line power, the inverter operates as an H-bridge inverter. With battery power, the battery voltage is applied to a smaller portion of the inverter's transformer primary. The changeover from line to battery power is determined by when an intermediate voltage tapped from the transformer drops below the battery voltage.

U.S. Pat. No. 5,017,800 to Divan discloses an apparatus for AC to DC to AC power conversion. It includes a rectifier bridge connected to an AC source, the rectifier bridge providing a DC output to DC bus lines. A full bridge of active switching devices is connected across the DC bus lines. The output of the bridge can provide AC output power to the load through a transformer. By providing an external DC power source such as a battery, uninterrupted power can be supplied to the load when the AC power source fails.

None of the above-mentioned references attempt to minimize inverter power consumption when no appliance is connected to the load terminals.

SUMMARY OF THE INVENTION

The present invention is directed to a power conservation circuit for removing power to a power device in the absence of a load. A switch is connected to output terminals on which a load is to be placed. The switch connects the output terminals to either a low voltage power supply or the powered device. Power into the powered device may be interrupted by a second switch. A control switch controls the state of the first and second switches. The power conservation circuit has an ON state in which the first switch connects the output terminals to the power device and the second switch conducts power to the powered device. In an OFF state, the first switch connects the output terminals to the low voltage power supply and the second switch disconnects power from the powered device. In the OFF state, the control switch is responsive to a load on the output terminals for causing the first and second switches to switch into the ON state. The power conservation circuit further includes circuitry for sensing during the ON state that a load is connected across the output terminals. As long as the load remains, the control switch is maintained with the first and second switches in the ON state. In the absence of a load, current stops flowing across the output terminals. This is sensed and causes the control switch to switch the first and second switches into the OFF state thereby conserving power to the powered device when it is not needed.

Other objects and advantages of the invention will become apparent during the following description of the presently preferred embodiments of the invention taken in conjunction with the drawings.

DETAILED DESCRIPTION OF THE PREFERRED EMBODIMENTS

A first embodiment of the invention is disclosed in the inventor's previous Pat. No. 5,324,990, the full disclosure of which is hereby incorporated by reference herein. In the first embodiment from said patent, the power conservation circuit has an ON state in which battery voltage (12 V DC) powers the inverter and inverter output voltage (120 V AC) is applied to a load via a pair of output terminals, and an OFF state in which battery voltage is disconnected from the inverter and applied to the output terminals.

The power conservation circuit remains in the OFF state as long as there is no load across the output terminals. When a load appears across the output terminals and the circuit is an OFF state, a small current flows, powered by the 12 V DC. This current is used to switch the power conservation circuit from the OFF state to the ON state.

The power conservation circuit remains in the ON state as long as load is maintained across the output terminals. The presence of load is sensed by the flow of alternating current. The cessation of alternating current is used to switch the power conservation circuit from the ON state to the OFF state.

Figure 1:
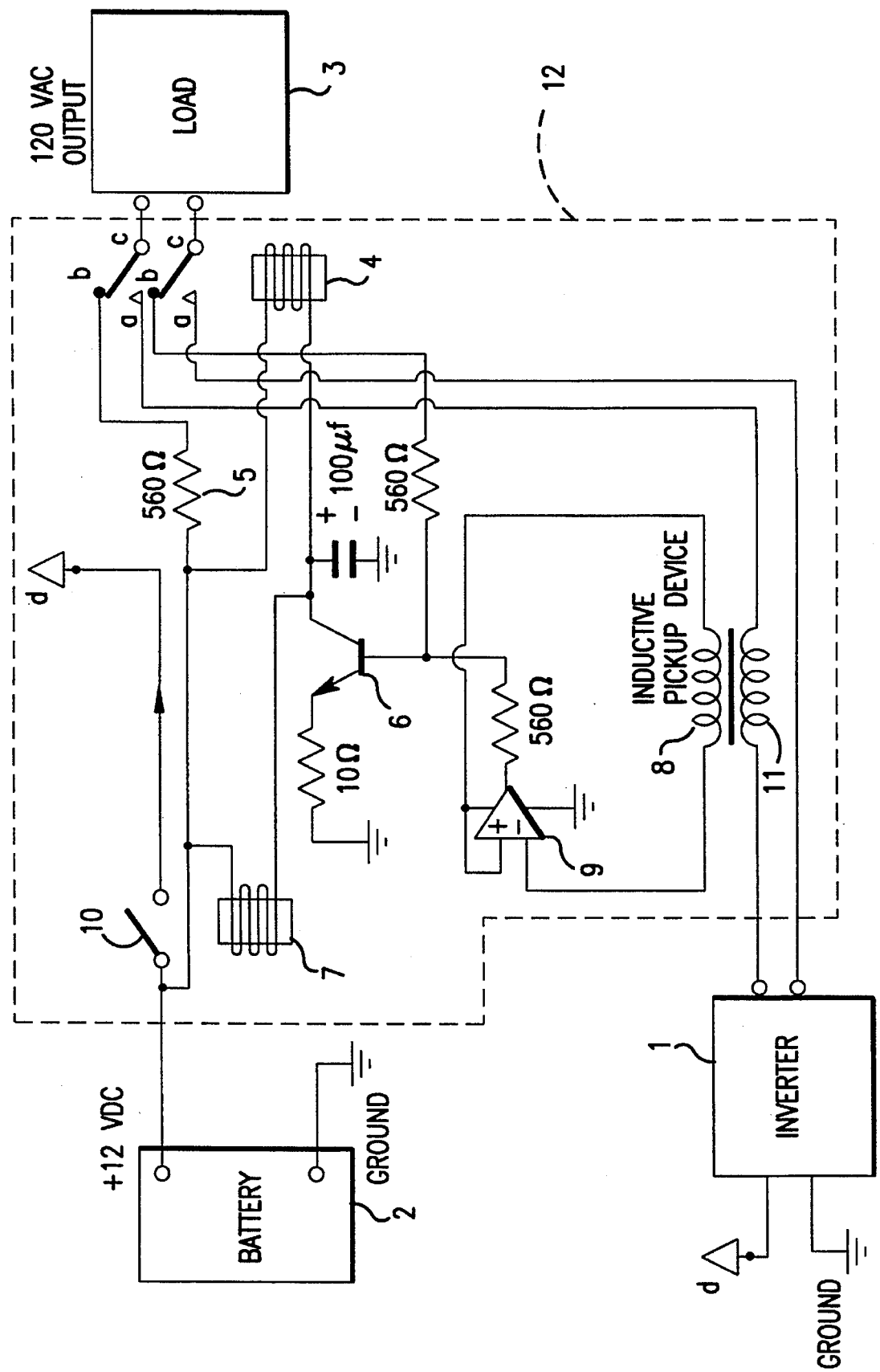
FIG. 1 is a schematic of a first embodiment of the power conservation circuit of the present invention controlling a DC to AC voltage inverter.

FIG. 1 shows the power conservation circuit 12, having circuit output terminals c—c. In the ON state, relays 7 and 4 are both energized so that contact 10 is closed (relay 7) and terminals c—c are connected across a—a (relay 4). Thus, in the ON state, (i) battery 2 powers inverter 1 via switch contact 10 and connection d—d and (ii) the inverter supplies 120 V AC power via contacts a—a to circuit output terminals c—c and thence to load 3. In the OFF state, relays 7 and 4 are both de-energized so that (i) the inverter is disconnected from the battery and from the load and (ii) battery 2 supplies 12 V DC via resistor 5 and contact b—b to terminals c—c. As long as there is no load across terminals c—c the control circuit remains in the OFF state. When a load is applied (i.e., load 3 becomes capable of passing current), a small current from battery 2 flows through resistor 5, through load 3 via contacts b—b to the base of power transistor 6, switching on the transistor. Transistor 6 may be an NTE 392 NPN power transistor. Switching on transistor 6 energizes double-pole double-throw (DPDT) relay 4 and single-pole, single-throw (SPST) relay 7. Relay 4 disconnects the load from the battery and connects the load via contacts a—a to the 120 V AC output of inverter 1. Relay 7 connects the battery to the coil of relay 4 thereby holding relay 4 energized via transistor 6. Relay 7 via (closed) contact 10 and connection d—d reconnects battery power to inverter 1, turning the inverter on. A 100 uF capacitor is included in connection with the collector of transistor 6 to keep the relays energized and avoid chattering during the ON state.

When the circuit is in the ON state, supplying 120 V AC power via contacts a—a to load 3, load current flows through coil 11 inducing a current in an inductive pickup coil 8. This induced current, applied to the input of operational amplifier 9, holds power transistor 6 ON. Operational amplifier 9 may be a Radio Shack LM324N Quad Op-Amp.

When load is removed (i.e., load 3 stops passing current) the induced current falls to zero, transistor 6 switches OFF discharging the 100 uF capacitor, relays 4 and 7 de-energize, load 3 is disconnected from the inverter output, contact 10 disconnects the inverter from the battery, and contacts a—a connect the battery to the load via output terminals c—c.

Figure 2A:
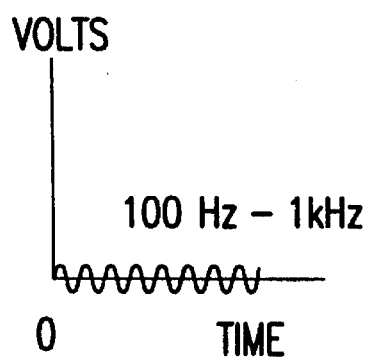
FIGS. 2A, 2B and 2C show an improvement of the circuit of FIG. 1 designed to accommodate inductive and capacitive loads.
Figure 2B:
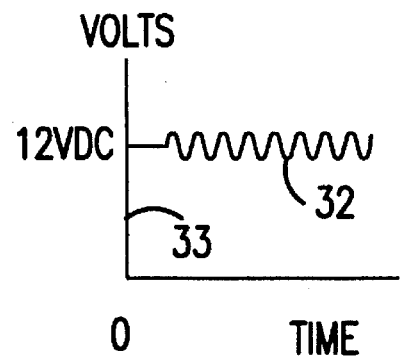
Figure 2C:
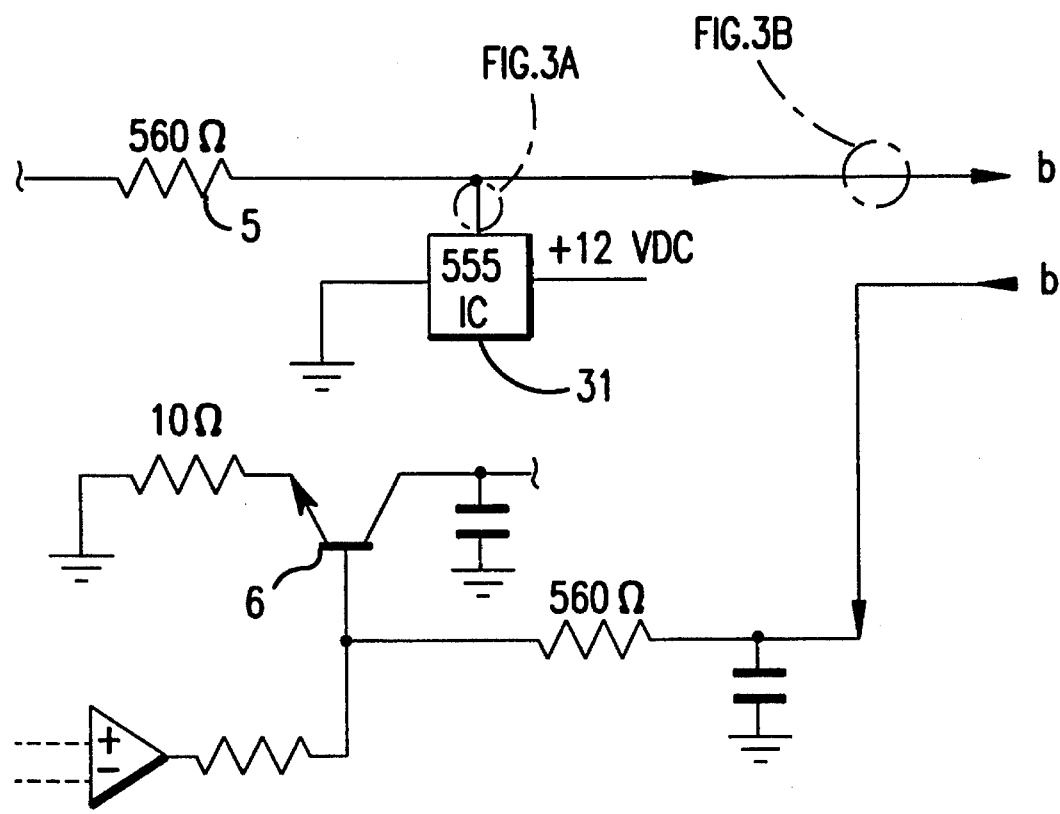

When the load is primarily capacitive, as is the case with some types of fluorescent lights, the load may draw insufficient current from the 12 V DC source for the control circuit to operate properly. In an improved embodiment of the present invention, an alternating or pulsating DC signal from a wave form generating circuit may be a Texas Instruments 555 timer integrated circuit. FIG. 2C shows a portion of the circuit of FIG. 1 with wave form generating integrated circuit 31 connected to the load end of resistor 5. The AC signal of FIG. 2A, having a frequency distinguishably greater than 60 HZ and preferably between 100 Hz and 1k HZ passes through the capacitive load and switches the power conservation circuit. FIG. 2B shows an AC voltage component 32 riding on a DC offset voltage component 33. The DC component is necessary for inductive loads. For example, a motor winding acting as a high inductance filter may block AC signals. To enable the power conservation control circuit to work with loads that may have a combination of resistive, capacitive and inductive characteristics, a load-detect voltage having a 12 volt DC component with a 2 volt AC component riding on top of it is provided.

Figure 3:
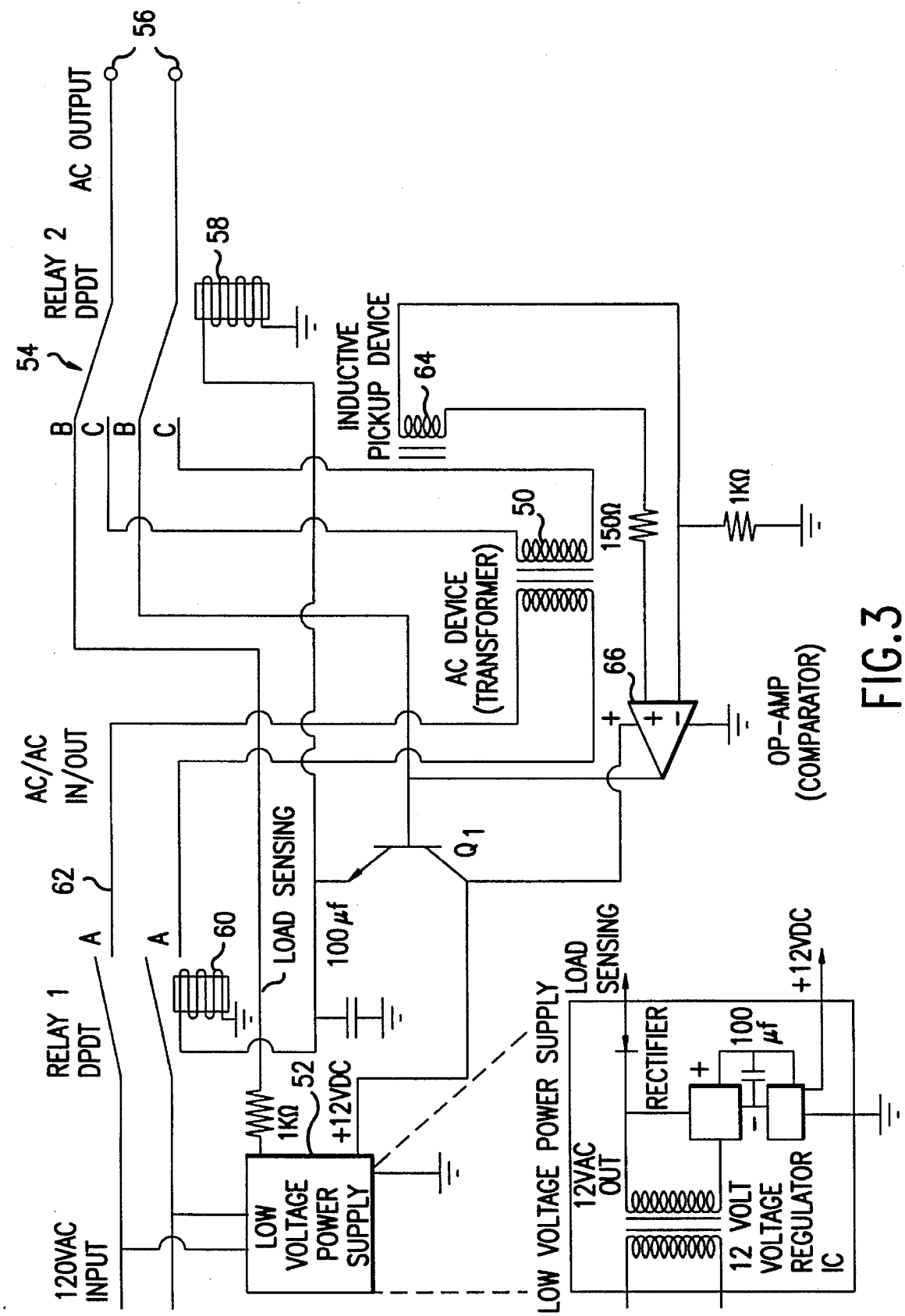
FIG. 3 is a schematic of a second embodiment of a power conservation circuit of the invention for controlling an AC transformer.

The present invention may be designed for use with powered devices of a variety of types. The powered device may go from DC to AC as with the inverter of FIG. 1, AC to AC, DC to AC or DC to DC. Referring now to FIG. 3, the invention is shown for use with an AC to AC transformer device 50. While shown here as a transformer, the powered AC device may be any of a variety of devices including AC motor drives, AC power supplies, etc. A low voltage power supply 52 is shown for operating the relay switches and for providing a current to detect the presence of a load. In the embodiment shown, the low voltage power supply is a 12 V voltage regulator integrated circuit. Alternatively, the low voltage power may be provided by a battery. In either case, the low voltage power supply 52 provides a significantly lower voltage than the output voltage of the powered device. The low voltage supply may be either DC, AC or both AC and DC to accommodate the type of load expected. The first switch 54 is a double-pole double-throw switch. The low voltage power supply 52 is connected through a 1K resistor to one of the contacts of the double-pole double-throw switch 54. A second contact for the same switch position of the switch 54 is connected to a transistor Q1. The transistor Q1 acts as the control switch. When a load is connected across the output terminals 56, a load sensing current travels from the low voltage power supply 52 through the load into the control switch. The base of transistor Q1 is the control terminal for the control switch. In the illustrated embodiment, the transistor Q1 is an NPN power transistor. Current received at the control terminal of the transistor Q1 causes this transistor to go to saturation. This provides the voltage from the low voltage power supply 52 to the relays 58, 60 which cause the switches 54, 62 to switch the circuit into an ON state. In the ON state, the first switch 54 connects the output terminals to the output from the transformer 50. The second switch 62 connects power to the transformer 50.

While the circuit is in the ON state, the continued draw of current through the transformer 50 is detected by a sensing circuit which in this case is an inductive pickup device 64. Alternative sensing devices, such as a Hall effect sensor, may be substituted for the inductive pickup device. As long as current continues to be drawn, the inductive pickup device 64 will develop a voltage. This voltage is applied at the inputs of an operational amplifier 66. When such a voltage is detected at the inputs of the op amp 66, it goes into a "high" state. The output of the op amp 66 is applied directly to the control terminal of the control switch Q1. The op amp continues to provide enough current to the base of transistor Q1 to hold in it saturation mode keeping both relays 58, 60 energized. When all loads are disconnected from the output terminals 56, the op amp 66 no longer detects a voltage and goes to a low state. This causes transistor Q1 to go to cutoff and deenergizes relays 58, 60. Relay 58 causes the output terminals to be connected to the low voltage power supply. Relay 60 causes the switch 62 to disconnect the transformer 50 from the input power. Thus, while there is no load on the output terminals, power is saved by being disconnected from the unneeded transformer 50. Loads may be added or removed from connection with the output terminals by simple on-off switches associated with any particular load.

Figure 4:
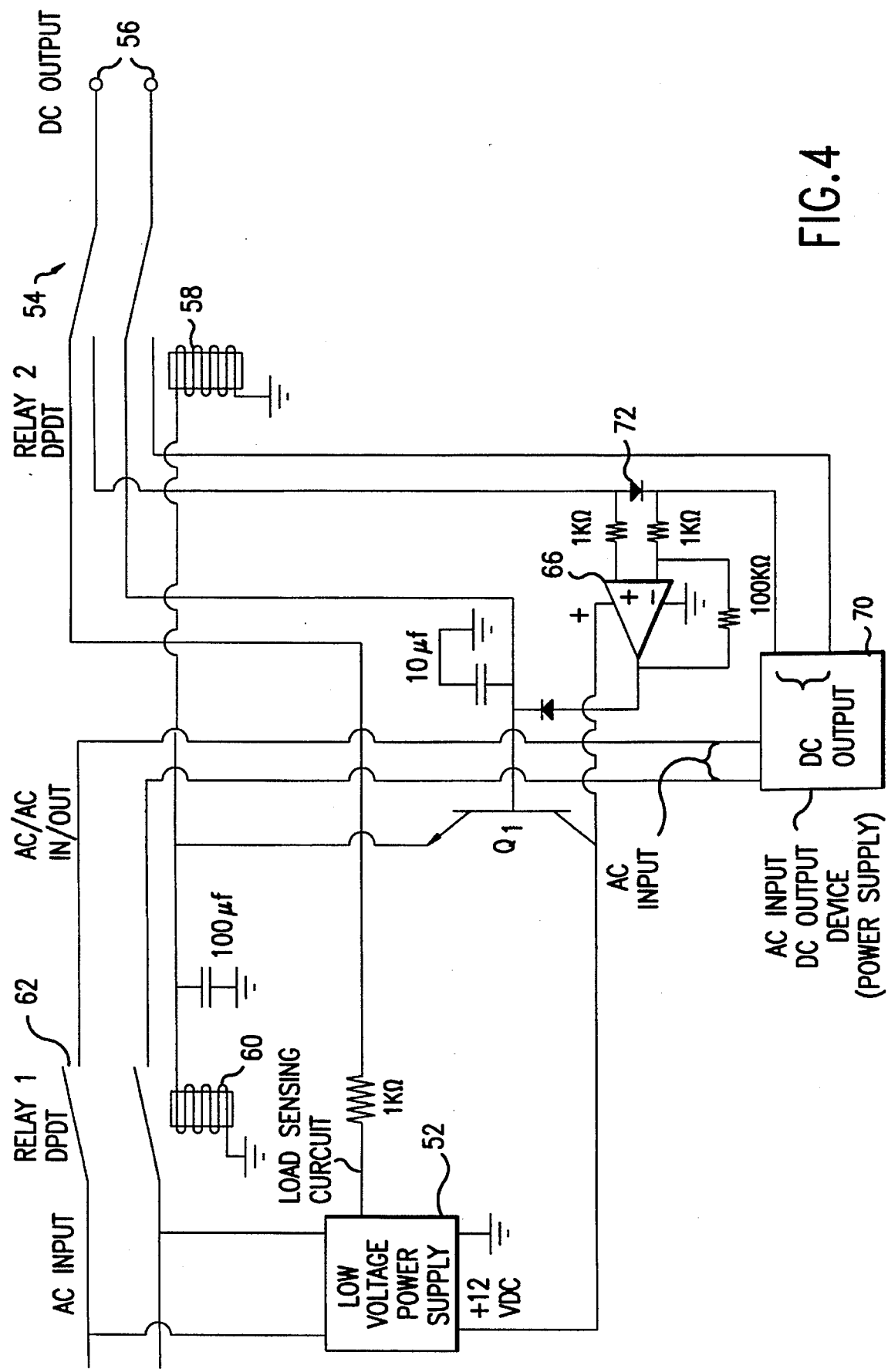
FIG. 4 is a schematic of a third embodiment of the power conservation circuit of the invention for use with an AC to DC powered device.

Referring now to FIG. 4, the power conservation circuit is shown for use with an AC input, DC output device 70. The circuit for detecting in the OFF state a load on the output terminals is essentially the same as set forth above in FIG. 3. The low voltage power supply 52 is connected through a 1K resistor to a contact of the first switch 54. When a load is present at the output terminals 56, the load sensing current is provided by the low voltage power supply through the switch 54 to the base of transistor Q1. Transistor Q1 causes relays 58, 60 to switch the first switch 54 and second switch 62 into the ON state. A 100 uF capacitor is connected between the transistor Q1 and the first and second switches to keep the switches energized in the ON state and avoid rapid undesired switching. In the ON state, power is provided through the second switch 62 to the AC to DC powered device 70. Since this is a DC output device, the presence of a load is detected with the use of a diode 72 rather than the inductive pickup device 64 used with the AC embodiment. Alternatively, a Hall effect sensor may be used to sense current and thus the presence of a load. When current is drawn through the output of the AC to DC device 70, a voltage of approximately 0.7 V is developed across the diode junction. This voltage is applied to the op amp 66. A 100K feedback resistor is included across the op amp 66 to prevent the op amp from being overly sensitive and triggering when no load has been detected. The voltage developed at the output of the op amp 66 provides enough current to the base of transistor Q1 to maintain the switches in the ON state. When the load is disconnected from the DC output of device 70, the op amp 66 no longer detects the voltage and goes to a low state. This causes the control switch transistor Q1 to go to cutoff and deenergizes relays 58, 60. This causes the first switch 54 and second switch 62 to switch into the OFF state. First switch 54 is reconnected to the low voltage power supply 52. AC to DC powered device 70 is disconnected from the AC input power.

Of course, it should be understood that various changes and modifications to the preferred embodiments described above will be apparent to those skilled in the art. For example, the low voltage power supply may be modified for any of the embodiments so as to handle capacitive or inductive loads as described above with respect to FIG. 2. Solid state switches may be substituted for the relays shown in the illustrated embodiments. Circuits of the invention may be designed to uses relays or switches that are normally open or normally closed. These and other changes can be made without departing from the spirit and the scope of the invention and without diminishing its attendant advantages. It is therefore intended that such changes and modifications be covered by the following claims.

I claim:

1. A power conservation circuit comprising:

a low voltage power supply;

output terminal means;

a first switch for connecting said output terminal means to either of said low voltage power supply and a powered device;

a second switch for conducting power to a powered device;

wherein said power conservation circuit has an ON state in which said first switch connects said output terminal means to the powered device and said second switch conducts power to the powered device and an OFF state in which said first switch connects said output terminal means to said low voltage power supply and said second switch disconnects the power from the powered device;

a control switch, connected to the output terminal means and to said first and second switches, responsive in the OFF state to a load on said output terminal means for causing said first and second switches to switch from the OFF state to the ON state; and means for sensing in the ON state a load connected across said output terminal means for maintaining said control switch with said first and second switches in the ON state while a load is connected across said output terminal means and for causing said control switch to switch said first and second switches from the ON state to the OFF state when the load is absent from said output terminal means.

2. The power conservation circuit of claim 1 wherein said low voltage power supply is a battery.

3. The power conservation circuit of claim 1 wherein said low voltage power supply is a regulator.

4. The power conservation circuit of claim 1 wherein said low voltage power supply provides an AC waveform.

5. The power conservation circuit of claim 1 wherein said first switch comprises a double pole double throw switch.

6. The power conservation circuit of claim 5 wherein said first switch further comprises a relay for operating the double pole double throw switch.

7. The power conservation circuit of claim 1 wherein said control switch comprises a transistor having a control terminal.

8. The power conservation circuit of claim 7 wherein the control terminal of said transistor is connected to the output terminal means so that in the OFF state when a load is connected across the output terminal means said low voltage power supply provides a signal through the load to the control terminal to cause said control switch to switch said first and second switches to the ON state.

9. The power conservation circuit of claim 1 wherein said sensing means comprises a diode connected between the powered device and said output terminal means and an amplifier connected to said diode for providing a signal to said control switch.

10. The power conservation circuit of claim 1 wherein said sensing means comprises an inductive pickup device coupled between the powered device and said output terminal means.

11. The power conservation circuit of claim 1 wherein said sensing means comprises a Hall effect sensor coupled to sense current between the powered device and said output terminal means.

12. A power conservation circuit, for use with a powered device having an output voltage for powering a load, comprising:

a low voltage power supply;

input terminal means for accepting the output voltage from the powered device;

output terminal means for delivering the output voltage to the load;

switch means, including a first switch connected between the input terminal means and the output terminal means and a second switch connected to the powered device, for switching the circuit between an ON state wherein power is connected to the powered device and the output voltage is connected to the output terminal means, and an OFF state wherein power is disconnected from the powered device and the low voltage power supply is connected to the output terminal means;

sensing means for (i) sensing in the ON state the absence of a load connected to the output terminal means and providing a first signal indicative of the absence of a load and (ii) sensing in the OFF state the presence of a load connected to the output terminal means and providing a second signal indicative of the presence of a load;

wherein the switch means includes means for receiving the first signal and switching from the ON state to the OFF state, and for receiving the second signal and switching from the OFF state to the ON state.

13. The power conservation circuit of claim 12 wherein said low voltage power supply is a battery.

14. The power conservation circuit of claim 12 wherein said low voltage power supply is a regulator.

15. The power conservation circuit of claim 11 wherein said low voltage power supply provides an AC signal.

16. The power conservation circuit of claim 12 wherein the first switch comprises a double pole double throw switch.

17. The power conservation circuit of claim 16 wherein the first switch further comprises a relay for operating the double pole double throw switch.

18. The power conservation circuit of claim 12 wherein said sensing means for sensing in the OFF state comprises a transistor having a control terminal connected to the output terminal means so that in the OFF state when a load is connected across the output terminal means said low voltage power supply provides current through the load to the control terminal to cause said transistor to generate the second signal.

19. The power conservation circuit of claim 12 wherein said sensing means for sensing in the ON state comprises a diode connected between the powered device and said output terminal means and an amplifier connected to said diode for causing the first signal to be generated.

20. The power conservation circuit of claim 12 wherein said sensing means for sensing in the ON state comprises an inductive pickup device coupled between the powered device and said output terminal means.

21. The power conservation circuit of claim 12 wherein said sensing means for sensing in the ON state comprises a Hall effect sensor coupled to sense current between the powered device and said output terminal means.

22. A power conservation circuit, for use with a powered device having an output voltage for powering a load, comprising:

a low voltage power supply for providing a voltage that is lower than the output voltage;

output terminal means for delivering the output voltage to the load;

a double pole double throw switch for connecting said output terminal means to said low voltage power supply in an OFF state and connecting said output terminal means to receive the output voltage from the powered device in an ON state;

a power switch connected to an input to the powered device, said switch connecting power to the powered device in the ON state and disconnecting power to the powered device in the OFF state;

a transistor coupled to said double pole double throw switch and said power switch and having a control terminal connected to said output terminal means for causing said double pole double throw switch and said power switch to switch from the OFF state to the ON state when said low voltage power supply provides a current to a load through said output terminal means; and sensing means for sensing in the ON state absence of a load connected to the output terminal means and providing a signal to the control terminal of said transistor indicative of the absence of a load;

wherein said transistor responds to the signal indicative of the absence of a load by causing said double pole double throw switch and said power switch to switch from the ON state to the OFF state.

23. The power conservation circuit of claim 22 wherein said low voltage power supply is a battery.

24. The power conservation circuit of claim 22 wherein said low voltage power supply is a regulator.

25. The power conservation circuit of claim 22 wherein said low voltage power supply provides an AC signal.

26. The power conservation circuit of claim 22 further comprising a relay connected to said transistor for operating the double pole double throw switch.

27. The power conservation circuit of claim 22 wherein said sensing means comprises a diode connected between the powered device and said output terminal means and an amplifier connected to said diode for providing the signal indicative of the absence of a load to said transistor.

28. The power conservation circuit of claim 22 wherein said sensing means comprises an inductive pickup device coupled between the powered device and said output terminal means.

29. The power conservation circuit of claim 22 wherein said sensing means comprises a Hall effect sensor coupled to sense current between the powered device and said output terminal means.

* * * * *